US006339999B1

(12) United States Patent
Newell

(10) Patent No.: US 6,339,999 B1
(45) Date of Patent: Jan. 22, 2002

(54) DETECTION OF ON-HEAT COWS

(76) Inventor: Robert James Newell, 13 Kiloanin Crescent, Banbridge, BT32 4NU, County Down (GB)

( * ) Notice: Subject to any disclaimer, the term of this patent is extended or adjusted under 35 U.S.C. 154(b) by 0 days.

(21) Appl. No.: 09/486,384

(22) PCT Filed: Aug. 26, 1998

(86) PCT No.: PCT/GB98/02571

§ 371 Date: Jul. 14, 2000

§ 102(e) Date: Jul. 14, 2000

(87) PCT Pub. No.: WO99/09910

PCT Pub. Date: Mar. 4, 1999

(30) Foreign Application Priority Data

Aug. 27, 1997 (GB) ............................................ 9718002

(51) Int. Cl.[7] ................................................ A01K 29/00
(52) U.S. Cl. ....................................... 119/421; 119/174
(58) Field of Search .................................. 119/174, 421

(56) References Cited

U.S. PATENT DOCUMENTS 4,574,734 A * 3/1986 Mandalaywala et al. .... 119/421
5,128,548 A * 7/1992 Goodson et al. ......... 250/341.1
5,717,202 A * 2/1998 Matsuda ................. 119/421 X

FOREIGN PATENT DOCUMENTS

DE 275389 * 1/1990 ................. 119/421

* cited by examiner

*Primary Examiner*—Robert P. Swiatek
(74) *Attorney, Agent, or Firm*—Ronald E. Greigg

(57) ABSTRACT

A method of detecting a first cow when mounted by a second cow. One or more beams of light are directed wholly or substantially horizontally at one or more detectors, and at a level above the first cow and corresponding to the additional height of the second cow when mounting the first cow, such that the mounting of the first cow by the second cow breaks one or more of the beams of light to one or more of the detectors and the one or each detected break causes activation of an alarm or a cow identification device or both. Mounting is an indication to the farmer that the cow is ready for insemination, and the invention provides an automatic method of alerting when a cow is in heat, or immediately identifying a cow in heat, which is only activated as and when the cow allows herself to be mounted. Preferably, two or more beams of light and two or more detectors are used, and the detectors work in partnership to coordinate two or more differently located cameras to the location of breakage of the light beams.

18 Claims, 4 Drawing Sheets

DETECTION OF ON-HEAT COWS

This invention relates to a method of detecting cows which are on-heat, and apparatus therefor.

Milking cows are generally kept pregnant every year to maintain lactation. In winter, the cows are kept in sheds. A cow's ovulation cycle is about three weeks, and it is obviously important for insemination to catch the cow at the right point of her cycle.

When a cow is on-heat, she will for a brief period allow herself to be mounted by another cow, similar to acceptance of a bull. The mounting is therefore a clear indication to the farmer that the cow is ready for insemination. However, the infrequency and short duration (usually only a few seconds) of mounting are such that the mounting will rarely coincide with the visits of the farmer to the cow shed. A farmer cannot stand and wait all day for such occurrences.

Two prior suggested methods of detection involve either pressure sensors on the cow's rear, or a pressure sensor on the cow's feet or on the floor to measure activity or weight differences. However, ordinary scratching by a cow of its rear can activate the first type of sensor, and in a cow shed with tens or hundreds of cows, there is always significant movement of the cows causing constant activity and weight differences.

According to one aspect of the present invention, there is provided a method of detecting a first cow when mounted by a second cow wherein one or more beams of light are directed wholly or substantially horizontally at one or more detectors, and at a level above the first cow and corresponding to the additional height of the second cow when mounting the first cow, such that the mounting of the first cow by the second cow breaks one or more of the beams of light to one or more of the detectors, and the or each detected break causes activation of an alarm means or a cow identification means or both.

Thus the present invention provides an automatic method of alerting when a cow on heat, and/or of immediately identifying a cow on heat, which is only activated as and when the cow allows herself to be mounted. The alarm means and the cow identification means could be used together either simultaneously or independently.

Any form or source of light capable of being focused along a beam could be used. Suitable forms of light beams include a laser and a light emitting diode period Where a single beam of light is used, the beam may be stationary but pass over a relevant area above the cows. Preferably the light beam scans an area, more preferably by rotation. The beam may be rotating constantly in one direction, or reversibly rotating across a sector.

Where a plurality of light beams are used, the beams may again be stationery, and arranged in parallel or in two or more different directions across a relevant area. Alternatively, each light beam is rotating.

A plurality of light beams whose paths overlap, either simultaneously or intermittently, further provides directional information on the location of the relevant cows. Any breaks in two or more of the beams caused by one mounting event may not occur simultaneously, especially if the beams are rotating. However, the multiple beam breakage should still occur contemporaneously for the same mounting event, so that locational information on the relevant cows is still achievable.

The or each beam of light may also be transmitted constantly or intermittently, e.g. pulsed. The frequencies of two or more beams of light may also be different to assist detection of which beam or beams are being broken by one detector or neighbouring detectors, possibly using matched frequency detectors.

The or each detector may be located remote from the source(s) of light. Any means for detecting the receipt of a beam of light is suitable, e.g. a photodiode. The or each detector could be dedicated, unidirectional and/or be designed to receive only one light frequency, or be of a more general nature. Alternatively, the or each beam of light is reflected by one or more reflective means to one or more detectors. Such detector(s) could again be remote from the or each source of light, or could be near or adjacent to the light source(s), possible within the same housing. The reflective means could be discrete or continuous, and could comprise one or more mirrors, or be a retroreflective strip or series of discs able to reflect light directly back independent of the angle of incidence.

The alarm means could be an audio, visual or electronic signal adapted to alert a farmer of mounting activity, to which he can then respond by visiting the cow shed. Preferably, the invention uses a cow identification means. The means for identifying the cow on-heat could be an active or passive means, i.e. a means able to mark the first cow or provide a mark able to identify the first cow for subsequent detection by the farmer, or a means of remotely identifying the cow, e.g. on one or more cameras. The first cow could be identified from its freeze-brand or other normally applied marking, or be marked with an additional preferably photogenic identifying mark such as video coding. The identification means may also be able to identify the second mounting cow, if desired or necessary.

The identification means could be located remotely from the or each light beam or the or each detector, or alternatively near or adjacent thereto. Using one or more directable cameras as the identification means, such cameras generally having different locations, should increase the chances of positive identification of the relevant first cow. Different identification means could be connected to different light beams. Alternatively, the locational information from all the detected broken light beams could be centrally processed to singularly focus the, some or all of the identification means towards the calculated mounting location.

According to one preferred embodiment of the present invention, two or more beams of light and two or more detectors are used, and the detectors work in partnership to co-ordinate two or more differently located cameras to the location of breakage of the light beams.

According to a second aspect of the present invention, there is provided an apparatus for detecting a first cow when mounted by a second cow, comprising one or more beams of light, one or more light detectors, and an alarm means or a cow identification means, wherein the or each beam of light is directed wholly or substantially horizontally at one or more detectors at a level above the first cow and corresponding to the additional height of the second cow when mounting the first cow, such that the mounting of the first cow by the second cow breaks one or more of the beams of light, and the or each detected break causes activation of the alarm means or cow identification means or both.

The present invention could be used in relation to one cow to be detected, or simultaneously for a small or large number of cows. The relevant cows could be particularly targeted, and possibly have their freedom of movement limited, or they could be allowed to roam over the area covered by the light beam(s) and detector(s). To cover a large number of cows, a number of light beams and detectors are preferred to cover the relevant area.

According to a third aspect of the present invention, there is provided a method of detecting a first cow when mounted by a second cow wherein a passive sensor is directed wholly or substantially horizontally a level above the first cow and corresponding to the additional height of the second cow when mounting the first cow, such that the mounting of the first cow by the second cow activates the sensor by altering the field of detection, and the sensor causes activation of an alarm means or a cow identification means or both.

The passive sensor could be a passive infra-red sensor, similar to those commonly used in room and outside security systems which activate on movement within the field of detection.

The present invention is applicable to all cows, whether they be dairy cows, beef cows or otherwise. It is equally applicable to other farm animals, such as pigs, which are bred or inseminated in a similar manner.

Embodiments of the present invention will now be described by way of example only with reference to the accompanying diagrammatic drawings in which.

Figure 1:
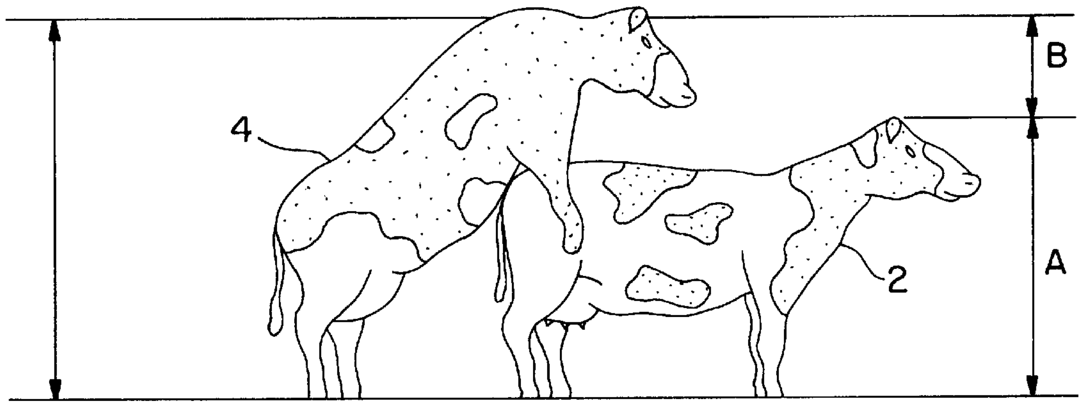
FIG. 1 is a side view of a first cow being mounted by a second cow.

Referring to the drawings, FIG. 1 shows a first cow 2 being mounted by a second cow 4, similar to mounting by a bull. The first cow 2 allows herself to be so mounted when she is on-heat. The mounting is a clear and obvious signal that the first cow 2 is ready for service, either naturally or using artificial insemination.

FIG. 1 also shows two height dimensions. The height of the first cow when standing. i.e. in a position to allow herself to be mounted, is "A". A suitable additional height of the mounting second cow 4 above the first cow is "B".

Figure 2:
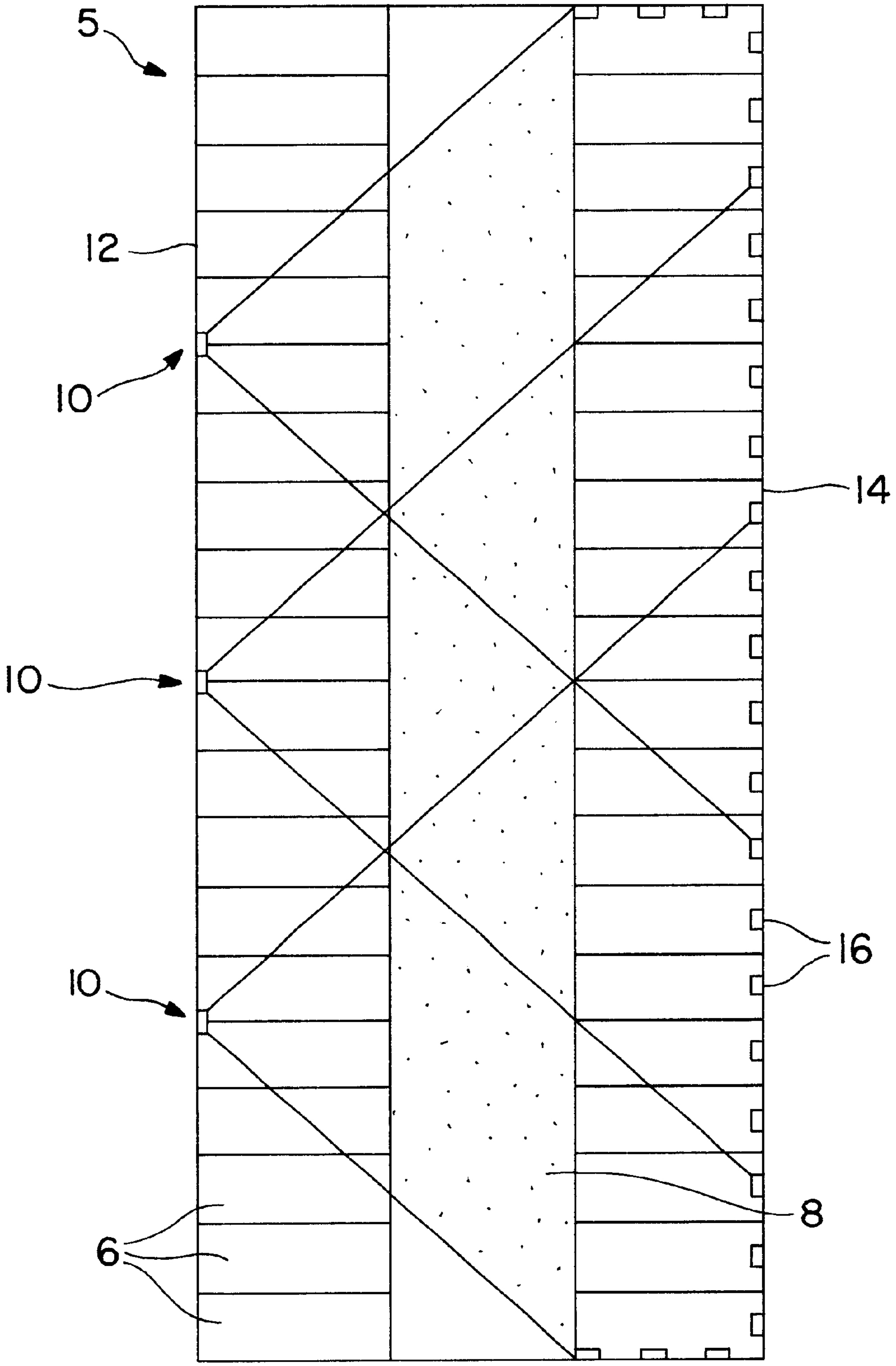
FIG. 2 is a plan view of a two lines of cattle stalls in a cow shed.

FIG. 2 shows a typical arrangement of two parallel lines of cattle stalls in a cow shed 5. There is a row of individual cattle stalls 6 on each side, with a perpendicular general run 8 in the middle. The stalls 6 are where the cows rest and sleep, and they are not usually wide enough or otherwise convenient for one cow to mount another cow therewithin. The run 8 is the general mixing and walking area for the cows and it is generally in the run 8 that mounting occurs.

FIG. 2 also shows three units 10 housing apparatus according to the present invention, spread along one back wall 12 of the shed 5. Also shown is the coverage of the run 8 by the units 10. The units 10 cover most of the run 8, and are intended to be side-on to the general direction of the cows along the run 8 to achieve the greatest view of the cows for better and easier identification. On the opposite wall 14 and adjoining sides of the cow shed 5 are a series of wall mounted retroreflective discs 16 able to return a beam of light at whatever angle received from a unit 10 back to that unit 10.

Figure 3:
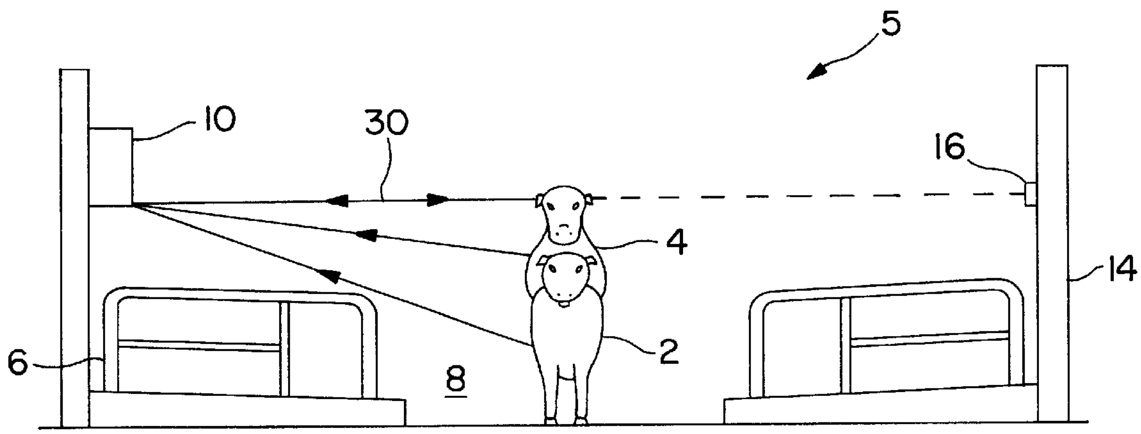
FIG. 3 is a side view of one apparatus according to the present invention, and cow stalls and cows.

FIG. 3 shows the first and second cows 2,4 of FIG. 1 head on in the run 8 of the cow shed 5 in FIG. 2. Also shown is a unit 10 and cattle stalls 6.

Figure 4:
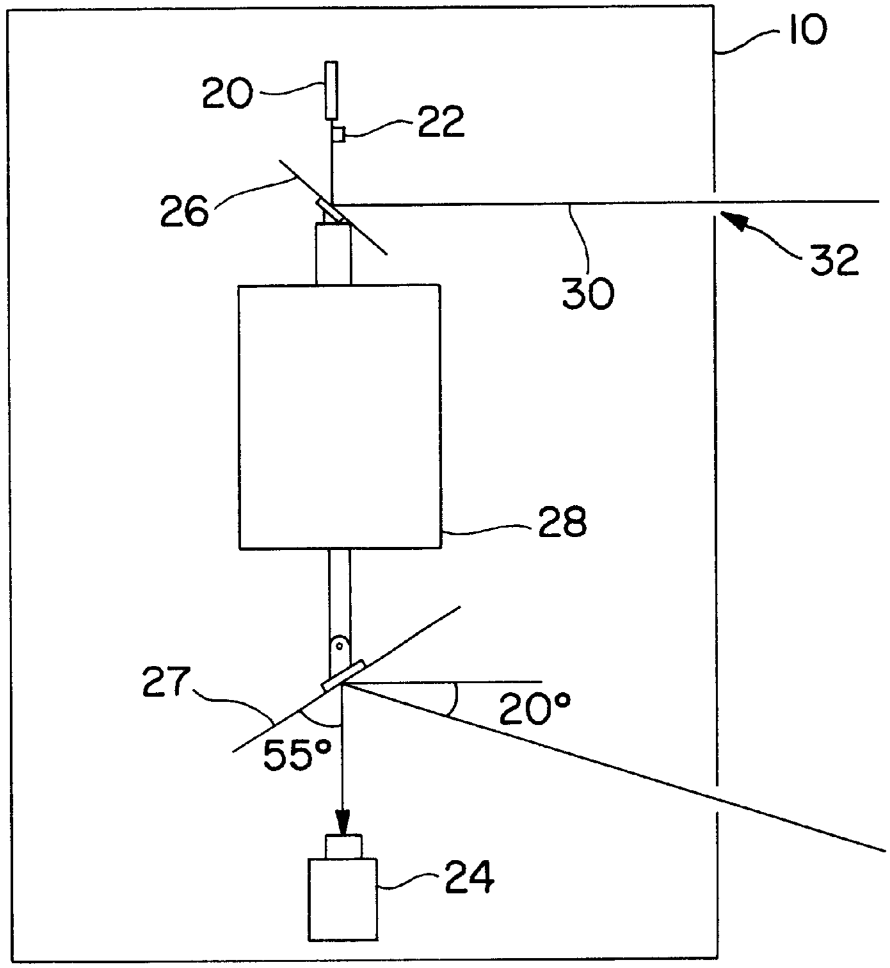
FIG. 4 is an enlarged side view of the apparatus in FIG. 3.

FIG. 4 shows the contents of the unit 10 in detail. The unit 10 houses a laser 20 and an almost co-axial photodetector 22 at an upper end, and a video camera 24 at a lower end as a cow identification means. In between are upper and lower aligned co-axial mirrors 26,27 respectively, which are rotatable on the shaft of an attached motor 28. The laser 20 creates a beam of light 30 which is reflected by the upper mirror 26 to travel through a cutaway 32 in the unit 10 and across the cow shed 5 wholly or substantially horizontally at a level corresponding to the additional height of the second cow 4 when mounting the first cow 2 (B in FIG. 1).

The light beam 30 is reflected back to the unit 10 by the retroreflective discs 16, and the reflected beam is reflected back by the rotating upper mirror 26 to the detector 22. The beam 30 will naturally broaden over distance, such that the detector 22 is able to see the edge or penumbra of the beam 30.

In use, the motor 28 rotates both mirrors 26, 27 either continuously or in an arc corresponding to the desired area of cover. Continuous rotation could cover 360°. An arc of rotation could be 180°if one unit 10 was used to cover an area from a side wall. In the present cow shed 5, the angle of rotation is about 90°, as shown in FIG. 2. Alternatively, the mirrors 26,27 are continuously rotated, but non-reflection of the beam 30 (and hence non-detection by the detector 22) when rotating within the housing is accounted for.

The rotating upper mirror 26 sends out and reflects the laser beam of light 30, which, if it is not broken by any mounting cows, is reflected back to the detector 22 by the retroreflective discs 16. The detector 22 takes account of the breaks in received light because the retroreflective discs 16 are discrete.

Where the second cow 4 mounts the first cow 2 as shown in FIG. 3, the light beam 30 is broken, and no return beam is received by the detector 22. The detector 22 then activates the video camera 24 to view and preferably record the event. The activation may be continuous from the detected break, or time delayed or sequenced to fit with rotation of the light beam 30 where broken. The camera 24 could possibly be activated after the beam 30 is detected as broken two or three times at the same point of rotation, to provide confirmation of mounting and avoid any brief and/or accidental beam breaks for other reasons.

Figure 5:
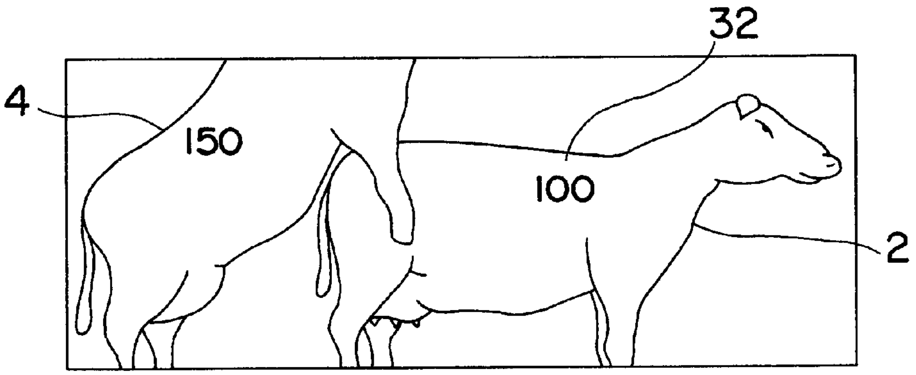
FIG. 5 is an image recorded by the camera in FIG. 4.

The video camera 24 maintains alignment with the direction of the light beam 30 via the co-axial lower mirror 27. The lower mirror 27 is angled so as to view the particular area of interest, i.e. the level of the first cow 2 in the run 8. Some or all of the second cow 4 may also be seen by the camera 24, and a typical image is shown in FIG. 5.

The cows 2, 4 may have identification marks 32 on their sides to help increase their identification to the farmer. The image may include recordal of the time to help confirm the timing of the cow's ovulation. A cow is on heat for an average of eight hours, but it can be as short as only two hours. Such a period could well be in the middle of the night when the farmer is unlikely to be present to see any mountings.

Once the laser beam 30 is re-detected by the detector 22, or after a set time period, the camera 24 is deactivated.

The video camera 24 signal could be played live on a screen remote from the cow shed 5, e.g. in the farm kitchen. Preferably, the video camera images could be stored for viewing at a later time convenient to the farmer. The images could also be processed by suitable electronics to provide a more viewable recording. The video camera(s) could also be used as a general surveillance system in the cow shed, independently of any mounting detection system.

Figure 6:
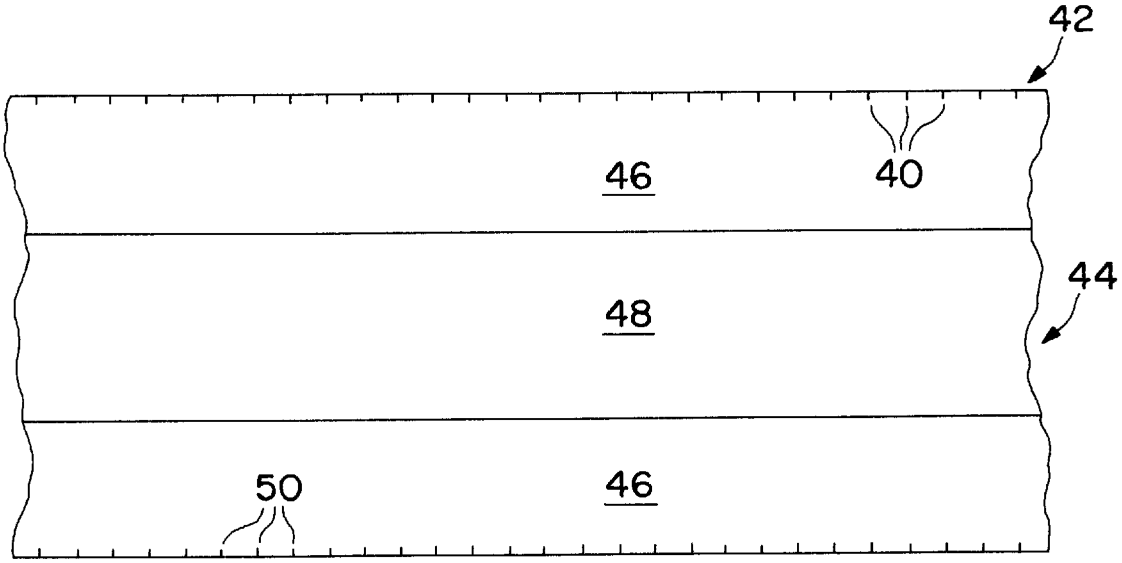
FIGS. 6 and 7 are two alternative arrangements for the present invention.

FIG. 6 schematically shows another alternative arrangement of the present invention. In this arrangement, multiple light beams are provided by a row of light emitting diodes (LEDs) 40 mounted along a strip 42, possibly 50 cm apart. The strip 42 is located along one side of a cow area 44, comprising aligned cubicles 46 on each side and a central run 48. The strip 42 is also located at a height corresponding to the additional height of a second cow on a first cow. The LEDs could include a directional lens to focus their beams towards the detectors.

On the opposing side of the cow area 44, are a row of matching photodiodes 50, each being the detector for the opposing LED. The tight beams transmitted by the LEDs could be individualistic, eg. by altering the frequency of each beam. The light beams could also be pulsed, e.g. serially, or otherwise non-continuous, so that the arrangement could distinguish between rapid beam breaks e.g. by birds, and longer beam breaks by the cows. The identification means could be as described above.

Figure 7:
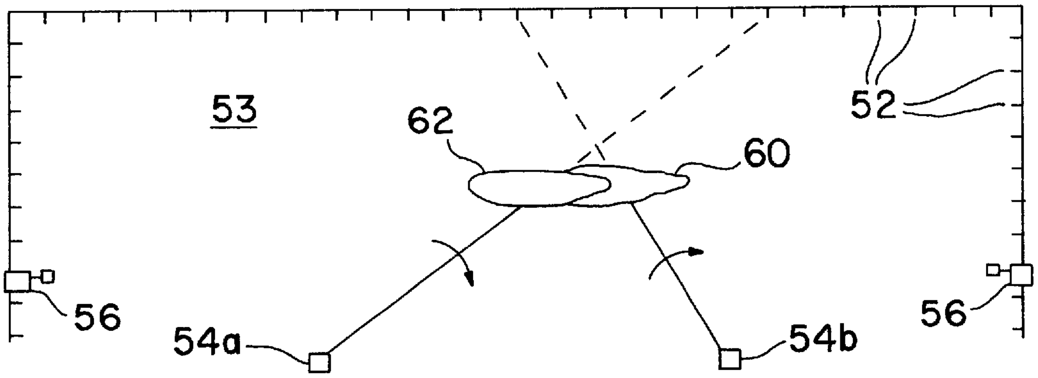

FIG. 7 shows a second alternative arrangement, again using scanning lasers and a series of retroreflective discs 52 around the cow shed 53, similar to those in FIG. 2. In FIG. 7, two scanning lasers 54*a* and 54*b* are used, rotated within a suitable housing with neighbouring detectors, similar to the arrangement shown in FIG. 4, in this way, locational information of a mounting event is possible, based on a comparison of the times and angles of the detected broken light beams by the detectors.

In this arrangement, the identification means is two or more independent and directable video cameras 56 mounted at a significant height above the general cow level. Each camera has motorised two dimensional movement so as to be able to pan and tilt, and is thus able to view the entire relevant area. Their movement could be controlled by a remote control processor, e.g. a computer, to provide multiple views of the relevant cows, and hopefully therefore better identification of the mounted cow. Each camera may also have a zoom lens.

In use, a first cow 60 is mounted by a second cow 62 in the cow shed 53. The beam of the first laser 54*a* is broken and the control processor notes the time and angle of the beam at this point. Similarly, the control processor notes the time and angle of the beam of the second laser 54*b* when it too is broken by the mounting event. Distending the broken beam angles from the locations of the lasers 54*a* and 54*b* provides the point of intersection where the mounting event must be occurring in the cow shed 53. The control processor can then direct the remote cameras 56 to aim and focus on the point of intersection.

In a busy cow shed and/or with many cows moving about, it is possible that some mountings may be missed, e.g. when behind another mounting cow or the lower cow cannot be seen for other cows in the way. However, as a cow usually allows herself to be mounted several times over the relevant period, it is expected that at least one of the mountings will be detected and provide a clear image of the lower cow.

The present invention provides a convenient method of detecting a cow on-heat without involving the farmer. The apparatus required is simple and easy to install in areas housing cows. The apparatus can be located above the normal height of the cows so that they cannot damage it. The method is also non-intrusive.

Variations and modifications can be made without departing from the scope of the invention described above and as claimed hereinafter.

I claim:

1. A method of detecting a first cow when mounted by a second cow which comprises directing one or more beams of light wholly or substantially horizontally at one or more detectors, and at a level above the first cow and corresponding to an additional height of the second cow when the second cow mounts the first cow, such that the mounting of the first cow by the second cow breaks one or more of the beams of light to one or more of the detectors, and the one or each detected break causes activation of a selected one of an alarm means, a cow identification means or both.

2. A method as claimed in claim 1, wherein one or each beam of light is provided by a laser or a light emitting diode.

3. A method as claimed in claim 2, using a plurality of stationary light beams.

4. A method as claimed in claim 2, wherein one or each light beam rotates.

5. A method as claimed in claim 4, using a plurality of rotating light beams with a phase angle therebetween.

6. A method as claimed in claim 1, using a plurality of stationary light beams.

7. A method as claimed in claim 6, using a plurality of light beams wherein the detected light beam breaks from two or more detectors and are co-ordinated to provide locational information of the first and second cows.

8. A method as claimed in claim 1, wherein one or each light beam rotates.

9. A method as claimed in claim 8, using a plurality of rotating light beams with a phase angle therebetween.

10. A method as claimed in claim 1, wherein one or each detector is remote from its associated beam of light.

11. A method as claimed in claim 1, wherein the one or each detector is near to or adjacent its associated beam of light.

12. A method as claimed in claim 1, wherein one or more beams of light are reflected prior to reaching one or more detectors.

13. A method as claimed in claim 1, using a cow identification means, wherein the cow identification means is located remotely from the one or each light beam or one or each detector.

14. A method as claimed in claim 1, using a cow identification means, wherein the cow identification means is located near to or adjacent the one or each light beam or the one or each detector.

15. A method as claimed in claim 14, wherein one or each camera is directed at the first and second cows, independently of the direction of the one or each light beams.

16. A method as claimed in claim 1, wherein the cow identification means includes one or more cameras.

17. A method as claimed in claim 1, wherein the first cow has an identifying mark.

18. A method as claimed in claim 1, wherein two or more beams of light and two or more detectors are used, and the detectors work in partnership to co-ordinate two or more differently located cameras to the location of breakage of the light beams.

* * * * *